US012327313B2

United States Patent
Graziosi et al.

(10) Patent No.: US 12,327,313 B2
(45) Date of Patent: Jun. 10, 2025

(54) PATCH GENERATION FOR DYNAMIC MESH CODING

(71) Applicants: SONY GROUP CORPORATION, Tokyo (JP); Sony Corporation of America, New York, NY (US)

(72) Inventors: Danillo Graziosi, Flagstaff, AZ (US); Alexandre Zaghetto, San Jose, CA (US); Ali Tabatabai, Cupertino, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 252 days.

(21) Appl. No.: 17/987,846

(22) Filed: Nov. 15, 2022

(65) Prior Publication Data

US 2023/0306684 A1 Sep. 28, 2023

Related U.S. Application Data

(60) Provisional application No. 63/269,910, filed on Mar. 25, 2022.

(51) Int. Cl.
*G06T 17/20* (2006.01)
*G06T 5/77* (2024.01)
(Continued)

(52) U.S. Cl.
CPC ............... *G06T 17/20* (2013.01); *G06T 5/77* (2024.01); *G06T 7/13* (2017.01); *G06T 7/50* (2017.01); *G06V 10/26* (2022.01); *G06V 10/764* (2022.01)

(58) Field of Classification Search
CPC .. G06T 17/20; G06T 5/77; G06T 7/50; G06T 7/13; G06T 9/001; G06V 10/26; G06V 10/764
See application file for complete search history.

(56) References Cited

U.S. PATENT DOCUMENTS

| | | | | |
|---|---|---|---|---|
| 5,601,084 A | * | 2/1997 | Sheehan | ................ B82Y 15/00 600/416 |
| 6,167,159 A | * | 12/2000 | Touma | .................... G06T 17/20 382/242 |

(Continued)

FOREIGN PATENT DOCUMENTS

WO WO-2019077199 A1 4/2019

OTHER PUBLICATIONS

Danillo Granziosi (Sony) et al: "[V-PCC] [EE2.6-related] Mesh Geomtry Smoothing Filter", 132. MPEG Meeting; Oct. 12, 2020-Oct. 16, 2020; Online; (Motion Picture Expert Group or ISO/IEC JTC1/SC29/WG11), No. m55374, Oct. 13, 2020 (Oct. 13, 2020), XP030291886.

(Continued)

*Primary Examiner* — Phi Hoang
(74) *Attorney, Agent, or Firm* — Haverstock & Owens, A Law Corporation (57) ABSTRACT

An architecture includes new blocks that transform mesh connectivity to enable lossy compression. In addition, a method generates surface patches from meshes and preserves the overall aspect of the object, while generating patches for efficient encoding using the V3C standard. Triangles are joined together into connected components, and conditional projection of each triangle to the surface is performed to enforce connectivity at the projected surface. A new depth filtering algorithm is able to be used to improve compression performance. The new blocks added for connectivity compression and the techniques introduced to ensure 2D connectivity to allow for UV texture map transmission and to filter depth values and avoid high-frequency edges in the depth image are described herein.

18 Claims, 8 Drawing Sheets

(51) Int. Cl.
*G06T 7/13* (2017.01)
*G06T 7/50* (2017.01)
*G06V 10/26* (2022.01)
*G06V 10/764* (2022.01)

(56) References Cited

U.S. PATENT DOCUMENTS

| | | | |
|---|---|---|---|
| 6,801,215 B1* | 10/2004 | Silva | G06T 15/40 |
| | | | 345/641 |
| 2007/0057938 A1* | 3/2007 | Usami | G06T 17/20 |
| | | | 345/418 |
| 2009/0146995 A1* | 6/2009 | Van Bael | G06T 15/00 |
| | | | 345/419 |
| 2015/0002529 A1* | 1/2015 | Liu | G09G 5/026 |
| | | | 345/589 |
| 2015/0379763 A1* | 12/2015 | Liktor | G06T 15/005 |
| | | | 345/426 |
| 2021/0174551 A1 | 6/2021 | Graziosi | |
| 2021/0295566 A1 | 9/2021 | Graziosi | |
| 2023/0075304 A1* | 3/2023 | Zhang | G06T 9/001 |

OTHER PUBLICATIONS

Danillo Graziosi (Sony) et al: "[V-PCC] [EE2.6-related] Triangle Patch Data", 132. MPEG Meeting; Oct. 12, 2020-Oct. 16, 2020; Online; (Motion Picture Expert Group or ISO/IEC JTC1/SC29/WG11), No. m55370, Oct. 7, 2020 (Oct. 7, 2020), XP030292893.

* cited by examiner

PATCH GENERATION FOR DYNAMIC MESH CODING

CROSS-REFERENCE TO RELATED APPLICATION(S)

This application claims priority under 35 U.S.C. § 119(e) of the U.S. Provisional Patent Application Ser. No. 63/269,910, filed Mar. 25, 2022 and titled, "PATCH GENERATION FOR DYNAMIC MESH CODING," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

Recently, a novel method to compress volumetric content, such as point clouds, based on projection from 3D to 2D is being standardized. The method, also known as V3C (visual volumetric video-based compression), maps the 3D volumetric data into several 2D patches, and then further arranges the patches into an atlas image, which is subsequently encoded with a video encoder. The atlas images correspond to the geometry of the points, the respective texture, and an occupancy map that indicates which of the positions are to be considered for the point cloud reconstruction.

In 2017, MPEG had issued a call for proposal (CfP) for compression of point clouds. After evaluation of several proposals, currently MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. This method has proven to be more efficient than native 3D coding, and is able to achieve competitive bitrates at acceptable quality.

Due to the success for coding 3D point clouds of the projection-based method (also known as the video-based method, or V-PCC), the standard is expected to include in future versions further 3D data, such as 3D meshes. However, current version of the standard is only suitable for the transmission of an unconnected set of points, so there is nomechanism to send the connectivity of points, as it is required in 3D mesh compression.

Methods have been proposed to extend the functionality of V-PCC to meshes as well. One possible way is to encode the vertices using V-PCC, and then the connectivity using a mesh compression approach, like TFAN or Edgebreaker. The limitation of this method is that the original mesh has to be dense, so that the point cloud generated from the vertices is not sparse and can be efficiently encoded after projection. Moreover, the order of the vertices affect the coding of connectivity, and different method to reorganize the mesh connectivity have been proposed. An alternative way to encode a sparse mesh is to use the RAW patch data to encode the vertices position in 3D. Since RAW patches encode (x,y,z) directly, in this method all the vertices are encoded as RAW data, while the connectivity is encoded by a similar mesh compression method, as mentioned before. Notice that in the RAW patch, the vertices may be sent in any preferred order, so the order generated from connectivity encoding can be used. The method can encode sparse point clouds, however, RAW patches are not efficient to encode 3D data, and further data such as the attributes of the triangle faces may be missing from this approach.

SUMMARY OF THE INVENTION

An architecture includes new blocks that transform mesh connectivity to enable lossy compression. In addition, a method generates surface patches from meshes and preserves the overall aspect of the object, while generating patches for efficient encoding using the V3C standard. Triangles are joined together into connected components, and conditional projection of each triangle to the surface is performed to enforce connectivity at the projected surface. A new depth filtering algorithm is able to be used to improve compression performance. The new blocks added for connectivity compression and the techniques introduced to ensure 2D connectivity to allow for UV texture map transmission and to filter depth values and avoid high-frequency edges in the depth image are described herein.

In one aspect, a method of patch generation comprises computing face normals of triangles, computing face adjacency of the triangles, computing face neighbors of the triangles, implementing initial segmentation including classifying the normals of the triangles, performing refinement including locating and smoothing outliers in the classified normals and performing patch segmentation of the triangles. Computing face adjacency of the triangles and computing face neighbors of the triangles includes generating lists of adjacent triangles and neighboring triangles. Generating lists of the adjacent triangles and the neighboring triangles includes factoring in a texture map boundary. Factoring in the texture map boundary involves excluding a triangle that is on an opposite side of the boundary of a current triangle. Performing patch segmentation comprises: removing degenerates, checking for vertex occlusion, checking for half-edges, checking for surface occlusion, depth filtering, depth range and connectivity analysis, and rasterizing a triangle. Removing degenerate triangles includes removing triangles that are lines or points by determining an area between the points is smaller than a threshold, checking for vertex occlusion includes determining whether a vertex of the triangle is occluded by an already projected triangle, checking for half-edges includes determining if the triangle shares an edge that is already shared by two projected triangles, checking for surface occlusion includes determining if an area between points of the triangle are occluded or would occlude the already projected triangle, depth filtering determines depth differentials of neighboring points and points of the triangle are smaller than a depth threshold, depth range and connectivity analysis includes determining whether the triangle touches at least one edge or vertex of the already projected triangles and projecting and rasterizing the triangle. The triangle is added to a missing triangles list when a criterion is not met.

In another aspect, an apparatus comprises a non-transitory memory for storing an application, the application for: computing face normals of triangles, computing face adjacency of the triangles, computing face neighbors of the triangles, implementing initial segmentation including classifying the normals of the triangles, performing refinement including locating and smoothing outliers in the classified normals and performing patch segmentation of the triangles and a processor coupled to the memory, the processor configured for processing the application. Computing face adjacency of the triangles and computing face neighbors of the triangles includes generating lists of adjacent triangles and neighboring triangles. Generating lists of the adjacent triangles and the neighboring triangles includes factoring in a texture map boundary. Factoring in the texture map boundary involves excluding a triangle that is on an opposite side of the boundary of a current triangle. Performing patch segmentation comprises: removing degenerates, checking for vertex occlusion, checking for half-edges, checking for surface occlusion, depth filtering, depth range and connectivity analysis, and rasterizing a triangle. Removing degenerate triangles includes removing triangles that are lines or points by determining an area between the points is smaller than a threshold, checking for vertex occlusion includes determining whether a vertex of the triangle is occluded by an already projected triangle, checking for half-edges includes determining if the triangle shares an edge that is already shared by two projected triangles, checking for surface occlusion includes determining if an area between points of the triangle are occluded or would occlude the already projected triangle, depth filtering determines depth differentials of neighboring points and points of the triangle are smaller than a depth threshold, depth range and connectivity analysis includes determining whether the triangle touches at least one edge or vertex of the already projected triangles and projecting and rasterizing the triangle. The triangle is added to a missing triangles list when a criterion is not met.

In another aspect, a method of patch segmentation comprises removing degenerate information, checking for vertex occlusion of a triangle, checking for half-edges of the triangle, checking for surface occlusion of the triangle, depth filtering of the triangle, performing depth range and connectivity analysis of the triangle and projecting and rasterizing the triangle onto a canvas. Removing degenerate triangles includes removing triangles that are lines or points by determining an area between the points is smaller than a threshold. Checking for vertex occlusion includes determining whether a vertex of the triangle is occluded by an already projected triangle. Checking for half-edges includes determining if the triangle shares an edge that is already shared by two projected triangles. Checking for surface occlusion includes determining if an area between points of the triangle are occluded or would occlude the already projected triangle. Depth filtering determines depth differentials of neighboring points and points of the triangle are smaller than a depth threshold. Depth range and connectivity analysis includes determining whether the triangle touches at least one edge or vertex of the already projected triangles. The triangle is added to a missing triangles list when a criterion is not met.

DETAILED DESCRIPTION OF THE PREFERRED EMBODIMENT

An architecture includes new blocks that transform mesh connectivity to enable lossy compression. In addition, a method generates surface patches from meshes and preserves the overall aspect of the object, while generating patches for efficient encoding using the V3C standard. Triangles are joined together into connected components, and conditional projection of each triangle to the surface is performed to enforce connectivity at the projected surface. A new depth filtering algorithm is able to be used to improve compression performance. The new blocks added for connectivity compression and the techniques introduced to ensure 2D connectivity to allow for UV texture map transmission and to filter depth values and avoid high-frequency edges in the depth image are described herein. The architecture described herein is related to U.S. patent application Ser. No. 17/322,662, filed May 17, 2021, titled "VIDEO BASED MESH COMPRESSION," U.S. Provisional Patent Application Ser. No. 63/088,705, filed Oct. 7, 2020 and titled, "VIDEO BASED MESH COMPRESSION" and U.S. Provisional Patent Application Ser. No. 63/087,958, filed Oct. 6, 2020 and titled, "VIDEO BASED MESH COMPRESSION," which are all hereby incorporated by reference in their entireties for all purposes. The method described herein is also related to U.S. patent application Ser. No. 17/161,300, filed on Jan. 28, 2021, and titled, "PROJECTION-BASED MESH COMPRESSION," which is hereby incorporated by reference in its entirety for all purposes.

Figure 1:
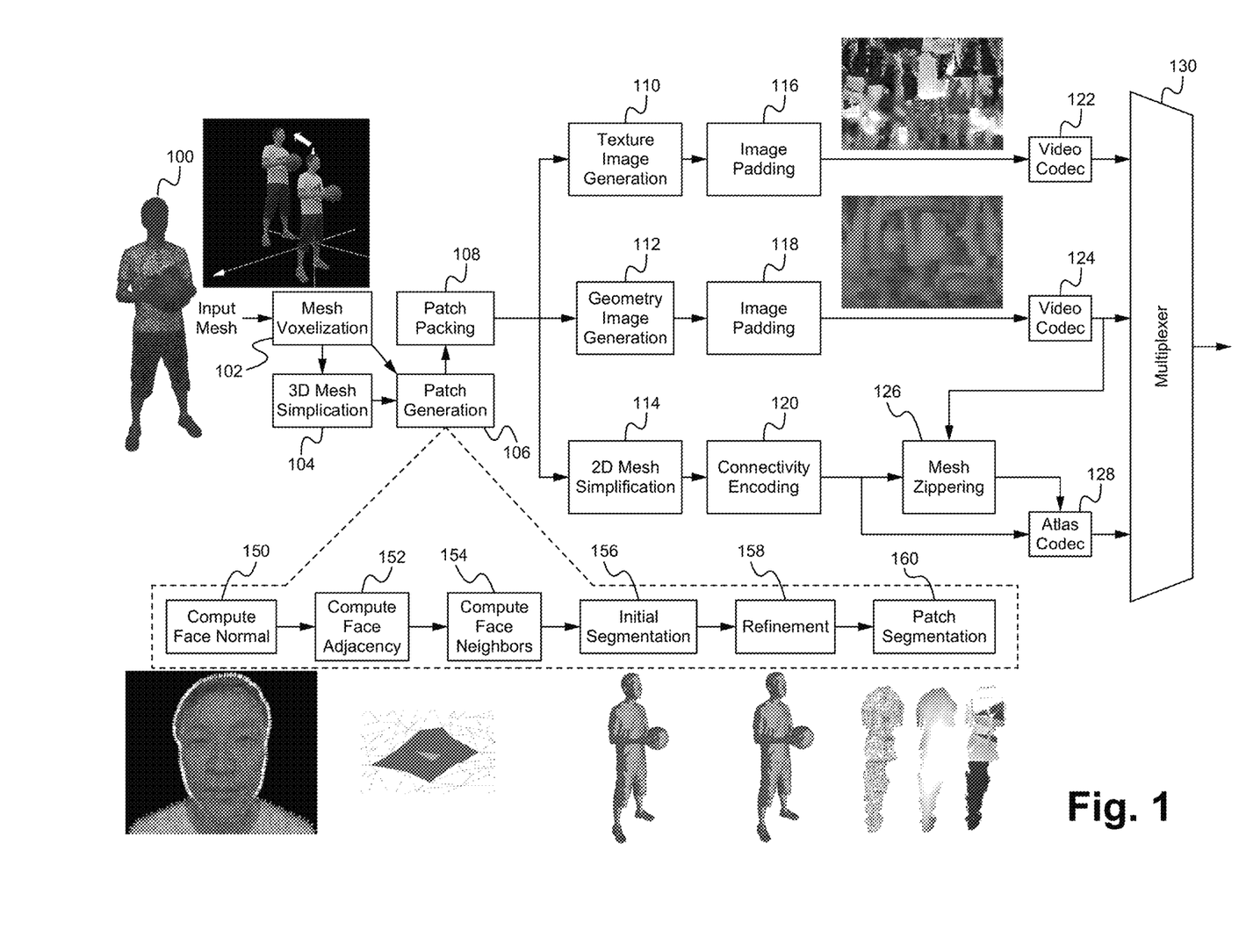
FIG. 1 illustrates a flowchart of a method of implementing dynamic mesh coding according to some embodiments.

FIG. 1 illustrates a flowchart of a method of implementing dynamic mesh coding according to some embodiments. An input mesh 100 is received or acquired. For example, the input mesh is downloaded (e.g., from a network device) or acquired/captured by a device (e.g., camera or autonomous vehicle).

Mesh voxelization 102 is performed. The mesh is able to have positions of vertices in floating point, so these positions are converted to the integer space. V-PCC and V3C assume a voxelized point cloud.

Then, 3D mesh simplification 104 is performed. 3D mesh simplification 104 is done before patch generation. 3D mesh simplification 104 reduces the number of triangles for projection, generates patches with low resolution information at the boundaries, and is able to recover the high-resolution information from geometry images, but boundaries are still low resolution.

Figure 5:
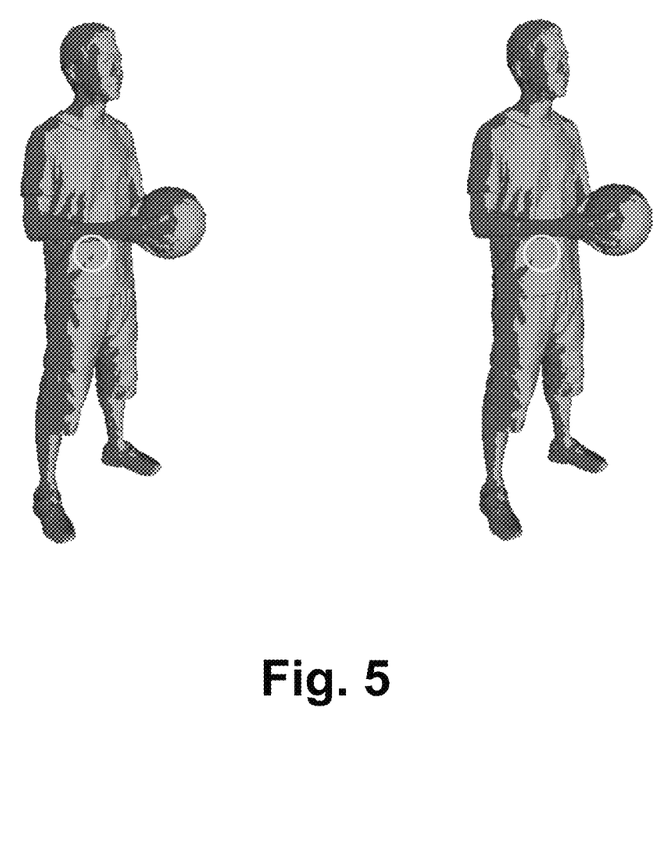
FIG. 5 illustrates a diagram of patch generation according to some embodiments.

In the step 106, patch generation (or creation) is implemented. Patch generation 106 includes: normal calculation 150, adjacency calculation 152, neighbor calculation 154, initial segmentation 156, refinement 158, and patch segmentation 160. Normal calculation 150 is calculating the normals of each triangle (e.g., cross product of the triangle's edges). Adjacency calculation 152 involves calculating each triangle's adjacency (e.g., which triangles in the mesh neighbor or touch the current triangle or other triangles). Neighbor calculation 154 includes calculating neighboring triangles. Initial segmentation 156 includes classifying the normal according to the orientation. For example, a normal of a triangle is able to point up, down, left, right, front, or back, and is able to be classified based on the direction/orientation. In some embodiments, the triangles are color-coded based on the orientation of their normals (e.g., all of the triangles with a normal pointing up are colored green). Refinement 158 involves locating outliers (e.g., a single red triangle surrounded by blue triangles) and smoothing out the outliers (e.g., changing the single red triangle to match its neighbors which are blue). The refinement 158 is performed by analyzing the neighbors and smoothing the orientation (e.g., adjusting the orientation of the normal). Once there is a smooth surface, then patch segmentation 160 is performed which involves segmenting the patches for a specific classification of triangles (e.g., based on orientation). Segmentation is able to include patch projection. With the segmentation, the vertices and connectivity are shown on the patches. For example, the body and face in this example are separate segmentations since there are triangles with different classifications separating the two. In some embodiments, the segmentation is rasterized (e.g., sampling points on the surface including the distance of the points to generate a geometry image and the attributes of the surface). The rasterized mesh surface is very similar to a V3C image.

Patch generation results in segmented patches or a rasterized mesh surface and vertices locations and connectivity. The segmented patches or rasterized mesh surface are utilized in patch packing, in the step 108. Patch packing 108 is able to include packing the patches in an atlas or 2D canvas.

After patch packing 108, the process continues to texture image generation 110, geometry image generation 112, and 2D mesh simplification 114. 2D mesh simplification 114 is performed after patch generation. 2D mesh simplification 114 reduces only the triangles inside a patch (boundary triangles are not reduced), generates patches with high-resolution information at the boundaries, and is able to recover high-resolution information from geometry images, including the boundary region, which was preserved in the patch.

From texture image generation 110 is image padding 116 and then the padded image goes to a video codec 122 for encoding. A texture image stores the texture information. Image padding 116 provides spacing between patches. The video codec 122 is able to perform any appropriate encoding scheme.

From geometry image generation 112 is image padding 118 and then the padded image goes to a video codec 124 for encoding. A geometry image stores the geometry information. Image padding 118 provides spacing between patches. The video codec 124 is able to perform any appropriate encoding scheme.

From 2D mesh simplification 114 is connectivity encoding 120 and then connectivity information goes to mesh zippering 126 and an atlas codec 128 for encoding. The mesh zippering 126 also receives information from the video codec 124. Connectivity encoding 120 includes encoding the connectivity information of the points. Mesh zippering 126 is an implementation to remove any gaps between triangles or patches.

A multiplexer 130 outputs the V3C bitstream. The V3C bitstream enables point cloud reconstruction and/or mesh construction. The point cloud and/or the mesh are able to be extracted from the V3C bitstream, which provides significant flexibility. In some embodiments, fewer or additional steps are implemented. In some embodiments, the order of the steps is modified.

Figure 2:
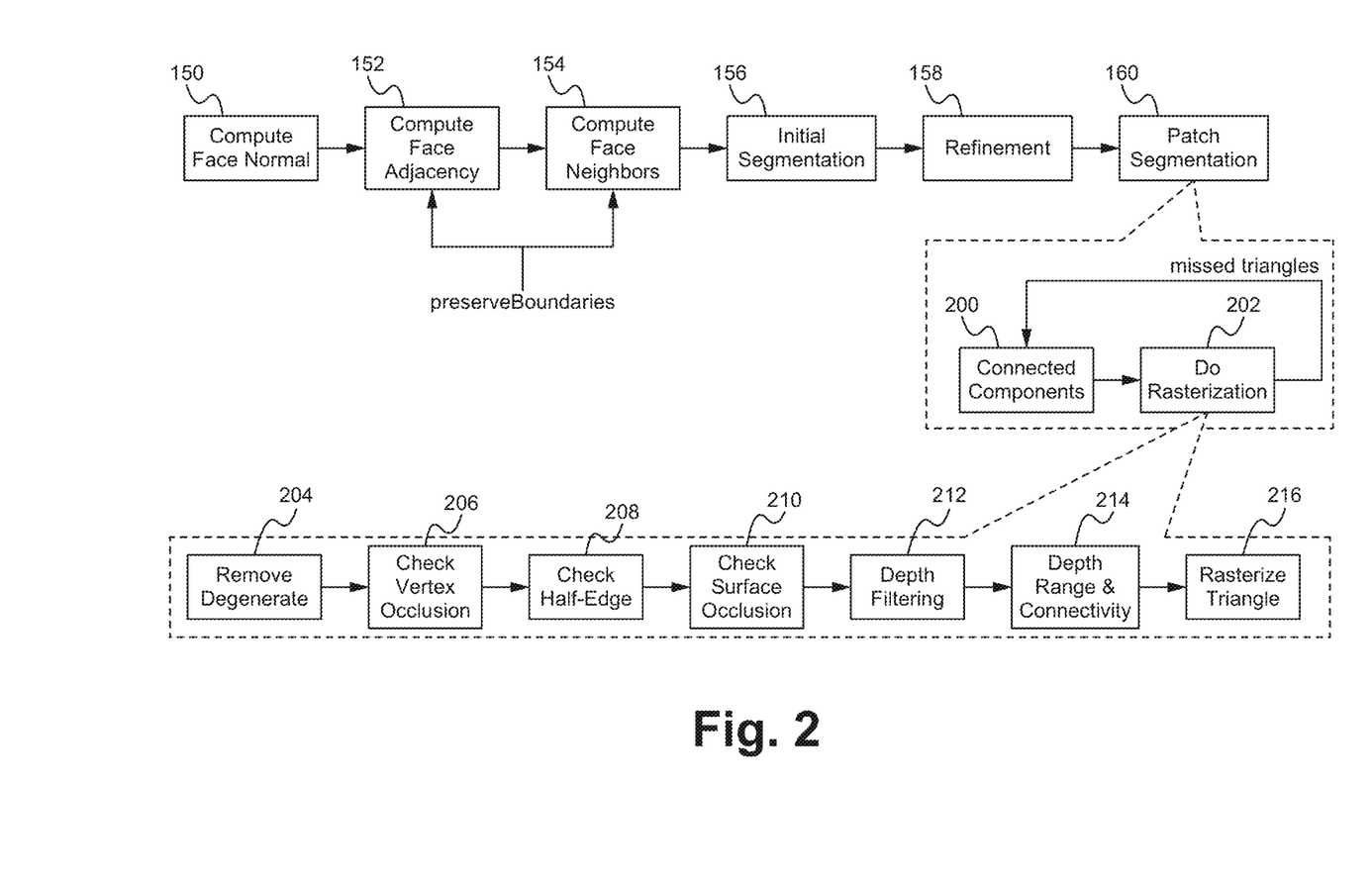
FIG. 2 illustrates a flowchart of a method of implementing patch generation according to some embodiments.

FIG. 2 illustrates a flowchart of a method of implementing patch generation according to some embodiments. Patch segmentation generates connected components 200. Connected components 200 are triangles that are neighbors and/or adjacent and have the same classification (e.g., same color in FIG. 5). For each triangle in a connected component, a conditional rasterization 202 is performed, meaning a triangle is projected into a patch only if it meets specified criteria. This ensures that the triangles are projected consistently. If a triangle does not meet the specified criteria, the triangle is considered a missed triangle, and a missed triangle goes back into a list and is re-tried with a different neighbor or adjacent triangle, and the process of analysis with the specified criteria is repeated.

The rasterization criteria (e.g., if the triangle is going to be projected or not), includes removing degenerates 204, checking vertex occlusion 206, checking half-edge 208, checking surface occlusion 210, depth filtering 212, depth range and connectivity 214, and rasterizing the triangle 216.

Removing degenerate triangles 204 includes removing triangles that are lines (e.g., where two of the points overlap, thus instead of a triangle, a line exists). A line or a point is removed, and only triangles that have at least a certain area (e.g., above a threshold) are retained.

Checking vertex occlusion 206 includes determining whether a vertex of the triangle is occluded. If the vertex of the triangle is occluded by (or would occlude) triangles that have already been projected, then the projection is not allowed, and the triangle is removed from the list and goes to the missed triangle list.

Checking half-edges 208 determines if the triangle to be projected shares an edge that is already shared by two projected triangles. If already shared, then the projection is not allowed, and the triangle is removed from the list and goes to the missed triangle list.

Checking surface occlusion 210 where even if the vertices of the triangle are not occluded but the area between the points are occluded (or would occlude) an already projected triangle (e.g., a vertex of an already projected triangle), then the projection is not allowed, and the triangle is removed from the list and goes to the missed triangle list.

Depth filtering 212 checks to makes sure the depth differentials of the triangles of the neighboring points are smaller than a threshold (e.g., points of the current triangle are compared with points of neighboring triangles). If the depth differentials are higher than the threshold, then the triangle is not projected.

Depth range and connectivity 214 includes determining whether the triangle to be projected touches at least one of the already projected triangles (e.g., a shared edge or vertex). If there is no connectivity between triangle to be projected and the already projected triangles, then the projection is not allowed, and the triangle is removed from the list and goes to the missed triangle list. The depth range is also checked.

If there is connectivity and an acceptable depth range (and all of the other criteria are satisfied), then the triangle is acceptable to be projected (e.g., on to a canvas), and the triangle is rasterized 216 (e.g., generating the points on the surface and generating the geometry image and the texture image to encode the connectivity on the patch).

Figure 3:
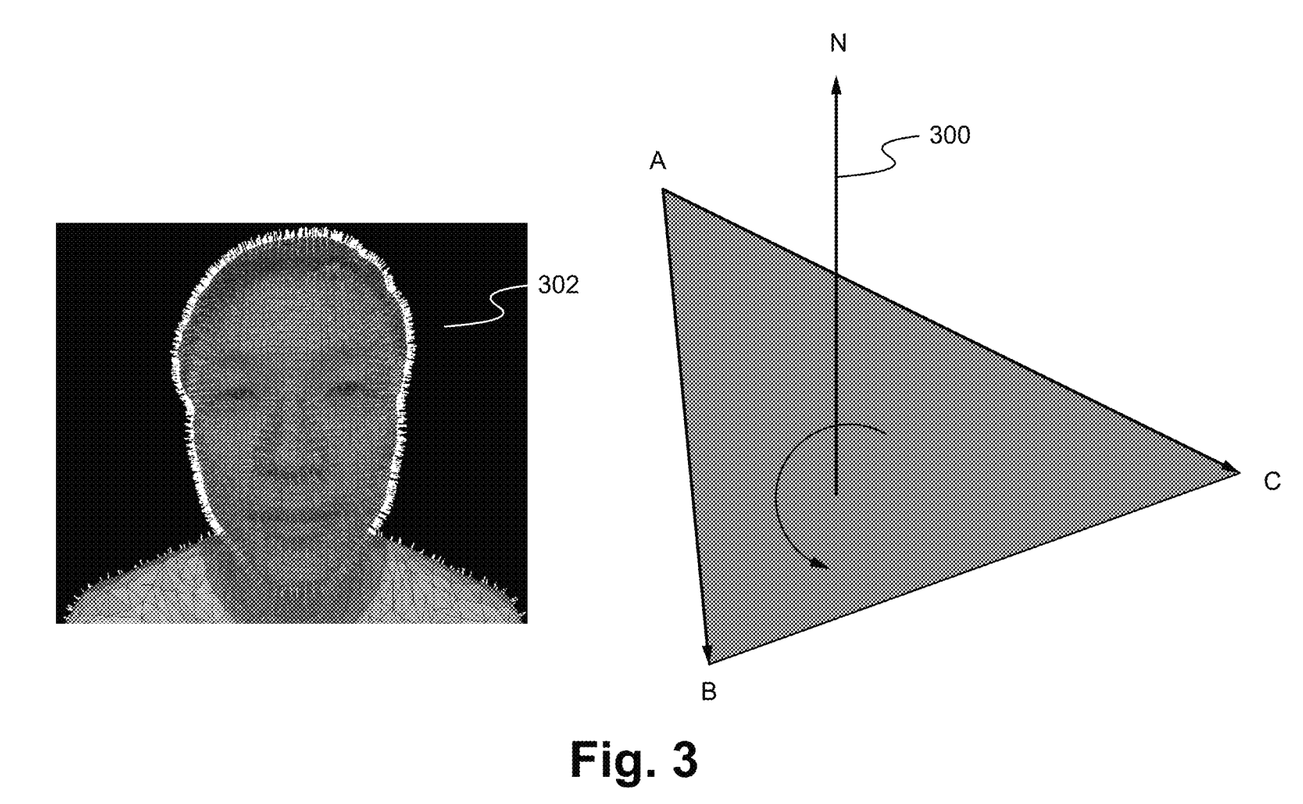
FIG. 3 illustrates a diagram of computing a normal according to some embodiments.

FIG. 3 illustrates a diagram of computing a normal according to some embodiments. In some embodiments, only face normals are computed. The normal 300 is the cross product of the two vectors (e.g., AB and AC). Image 302 illustrates an exemplary image with face normals.

Figure 4:
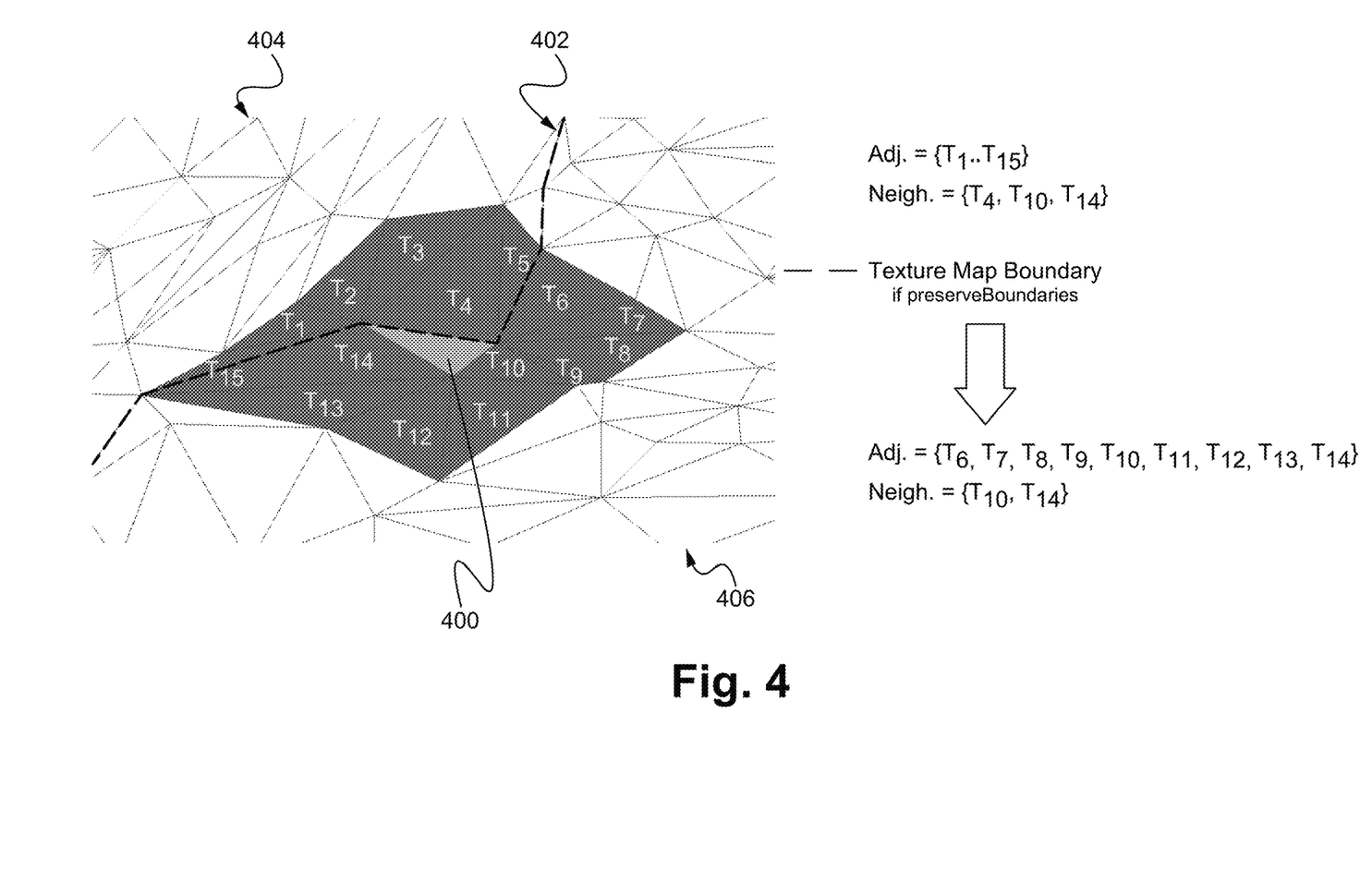
FIG. 4 illustrates a diagram of face adjacency and face neighbor analysis according to some embodiments.

FIG. 4 illustrates a diagram of face adjacency and face neighbor analysis according to some embodiments. Triangle 400 has many triangles that are adjacent and neighboring. Adjacent triangles are those triangles that share at least one vertex with the specified triangle. For example, Triangles 1-15 {$T_1, \ldots, T_{15}$} all share a vertex with Triangle 400. Neighboring triangles share an edge with a triangle. For example, Triangles 4, 10 and 14 {$T_4, T_{10}$ and $T_{14}$} share an edge with Triangle 400. Lists of adjacent triangles and neighboring triangles are able to be kept for each triangle. A flag is also able to be included to preserve boundaries.

Three dimensional (3D) triangles are mapped onto a two dimensional (2D) surface. To do that, the surface of the mesh is separated (e.g., into different groupings or sections). For example, the texture map boundary 402 separates one part or grouping 404 on a texture map and a second part or grouping 406 on the texture map. In other words, even though two triangles may be next to each other (e.g., neighbors) in a 3D space, they may be separated (e.g., not neighbors) in the 2D space since they are in different groupings in the 2D space. To preserve the texture map boundary, then when generating the two lists of adjacent triangles and neighboring triangles, the texture map boundary 402 is factored in. Therefore, when accounting for the texture map boundary 402 (e.g., excluding triangles that are not on the same side of the boundary as the targeted triangle), the list of adjacent triangles is {$T_6, \ldots, T_{14}$}, and the list of neighboring triangles is {$T_{10}, T_{14}$}, for Triangle 400. Therefore, when the patches are projected, the borders are maintained, which preserves the regional texture scenes, so they are available on the decoder side.

FIG. 5 illustrates a diagram of patch generation according to some embodiments. As described, patch generation involves normal calculation, adjacency calculation, initial segmentation (or normal categorization) and segmentation refinement (or category refinement). Calculating a normal of each triangle involves the cross-product between triangle edges. Adjacency calculation is determining if triangles share a vertex, and if so, the triangles are neighbors. Initial segmentation and segmentation refinement are performed the same as V-PCC by analyzing the orientation of the normals, classifying the orientations of the normals (e.g., up, down, left, right, forward, backward), and determining if an orientation of a normal is classified differently than neighboring normals that are all classified the same (e.g., a first patch is classified as up, while most or all of the neighboring patches are classified as forward), then changing the classification of the normal of the patch to match the neighbors' orientations (e.g., first patch classification is changed to forward).

As described, patch generation is implemented which segments the mesh into patches. Patch generation also generates 1) a rasterized mesh surface and 2) vertices location and connectivity information. The rasterized mesh surface is a set of points which go through the V3C image or a V-PCC image generation and is encoded as a V3C image or a V-PCC image. The vertices location and connectivity information is received for base-mesh coding.

Patch generation described herein is similar to patch generation in V-PCC. However, instead of calculating the normal per point, the normal per triangle is calculated. The normal per triangle is calculated using the cross-product between the edges to determine a normal vector. Then, the triangles are categorized according to the normals. For example, the normals are divided into n (e.g., 6) categories such as front, back, top, down, left and right. The normals are indicated in different colors to show the initial segmentation. FIG. 5 shows the different colors in grayscale such as the black and light gray as different colors indicating different normals. Although it may be difficult to see, top surfaces (e.g., the top of the person's head, the top of the ball and the top of the sneakers) are one color (e.g., green), a first side of the person/ball is very dark, representing another color (e.g., red), the bottom of the ball is another color (e.g., purple), and the front of the person and ball, which is mostly light gray, represents another color (e.g., cyan).

By multiplying the product of the normal by the directions, the main direction is able to be found. By looking at neighboring triangles, a smoothing/refinement process is able to be implemented. For example, if the number of neighboring triangles above a threshold are all blue, then this triangle also be classified as blue, even if there was an anomaly which initially indicated the triangle was red.

Connected components of triangles are generated to identify which of the triangles have the same color (e.g., triangles with the same category sharing at least one vertex).

Connectivity information describes how the points are connected in 3D. These connections together generate triangles (to be more specific, 3 distinct connections that share 3 points), which consequently generate surfaces (described by a collection of triangles). Although triangles are described herein, other geometric shapes are also allowed (e.g., rectangles).

Colors are able to be used to encode the connectivity by identifying the triangles with different colors. Each triangle, identified by three connections, is coded with a unique color.

Figure 6:
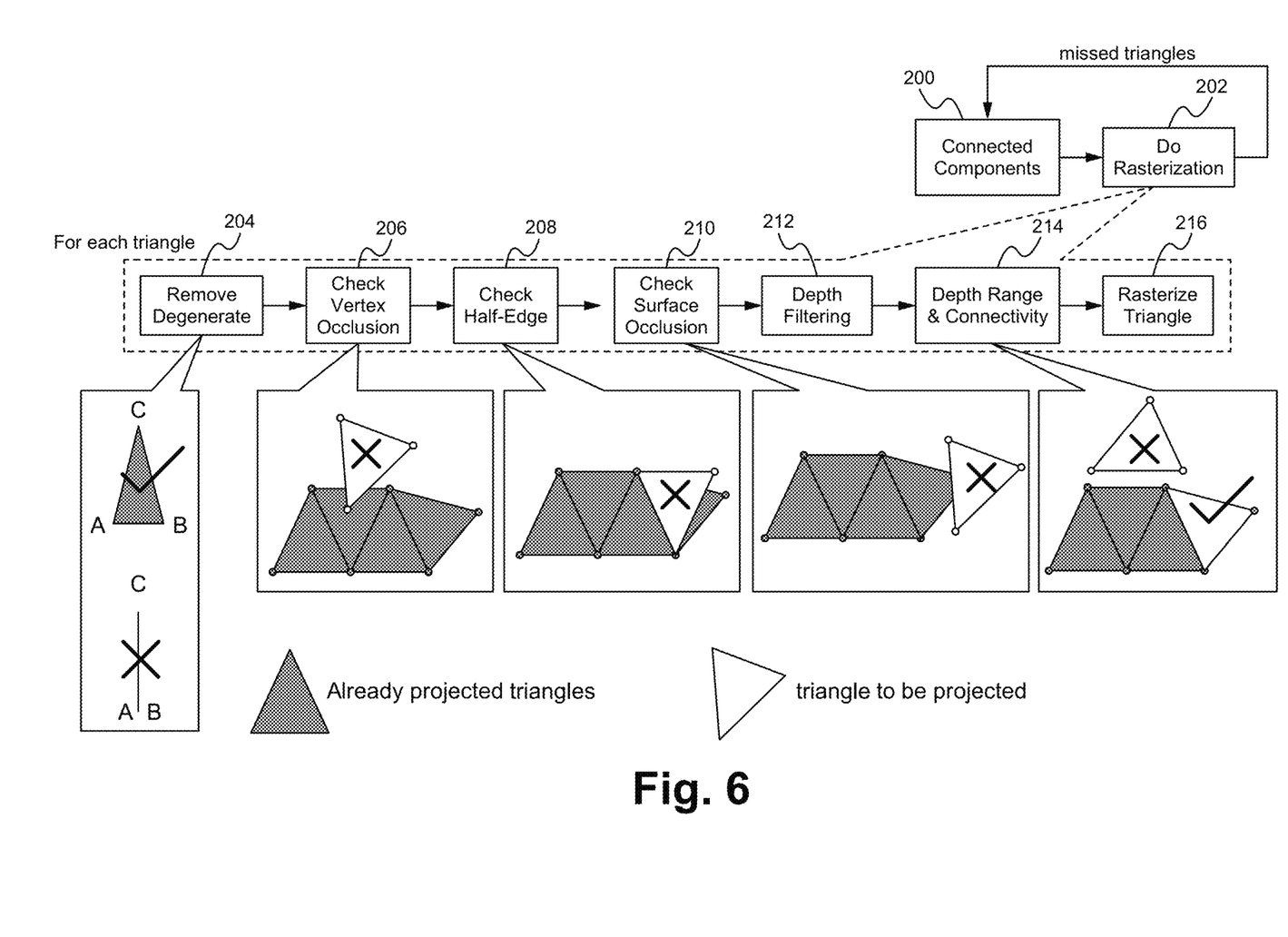
FIG. 6 illustrates a flowchart and diagram of patch segmentation using conditional rasterization according to some embodiments.

FIG. 6 illustrates a flowchart and diagram of patch segmentation using conditional rasterization according to some embodiments. Patch segmentation generates connected components 200. Connected components 200 are triangles that are neighbors and/or adjacent and have the same classification (e.g., same color in FIG. 5). For each triangle in a connected component, a conditional rasterization 202 is performed, meaning a triangle is projected into a patch only if meets specified criteria. This ensures that the triangles are projected consistently. If a triangle does not meet the specified criteria, the triangle is considered a missed triangle, and a missed triangle goes back into a list and is re-tried with a different neighbor or adjacent triangle, and the process of analysis with the specified criteria is repeated.

The rasterization criteria (e.g., if the triangle is going to be projected or not), includes removing degenerates 204, checking vertex occlusion 206, checking half-edge 208, checking surface occlusion 210, depth filtering 212, depth range and connectivity 214, and rasterizing the triangle 216.

Removing degenerate triangles 204 includes removing triangles that are lines (e.g., where two of the points overlap, thus instead of a triangle, a line exists). A line or a point is removed, and only triangles that have at least a certain area (e.g., above a threshold) are retained.

Checking vertex occlusion 206 includes determining whether a vertex of the triangle is occluded. If the vertex of the triangle is occluded by (or would occlude) triangles that have already been projected, then the projection is not allowed, and the triangle is removed from the list and goes to the missed triangle list.

Checking half-edges 208 determines if the triangle to be projected shares an edge that is already shared by two projected triangles. If already shared, then the projection is not allowed, and the triangle is removed from the list and goes to the missed triangle list.

Checking surface occlusion 210 where even if the vertices of the triangle are not occluded but the area between the points are occluded (or would occlude) an already projected triangle (e.g., a vertex of an already projected triangle), then the projection is not allowed, and the triangle is removed from the list and goes to the missed triangle list.

Depth filtering 212 checks to makes sure the depth differentials of the triangles of the neighboring points are smaller than a threshold (e.g., points of the current triangle are compared with points of neighboring triangles). If the depth differentials are higher than the threshold, then the triangle is not projected.

Depth range and connectivity 214 includes determining whether the triangle to be projected touches at least one of the already projected triangles (e.g., a shared edge or vertex). If there is no connectivity between triangle to be projected and the already projected triangles, then the projection is not allowed, and the triangle is removed from the list and goes to the missed triangle list. The depth range is also checked.

If there is connectivity and an acceptable depth range (and all of the other criteria are satisified), then the triangle is acceptable to be projected (e.g., on to a canvas), and the triangle is rasterized 216 (e.g., generating the points on the surface and generating the geometry image and the texture image to encode the connectivity on the patch).

Figure 7:
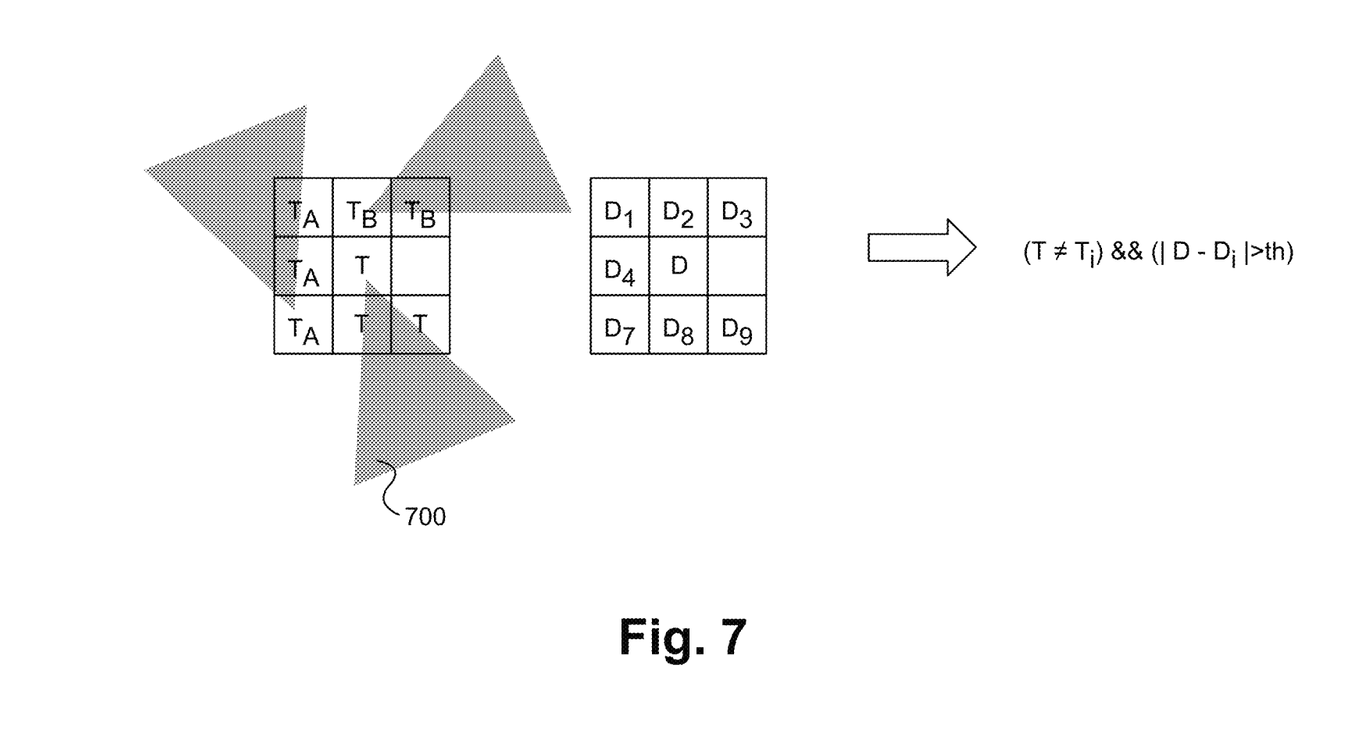
FIG. 7 illustrates a diagram of depth filtering according to some embodiments.

FIG. 7 illustrates a diagram of depth filtering according to some embodiments. Depth filtering checks to makes sure the depth differentials of the triangles of the neighboring points are smaller than a threshold. If the depth differentials are higher than the threshold, then the triangle is not projected. For example, a depth of a point and depths of neighboring points are analyzed. However, only neighboring points from other triangles are analyzed. In the Figure, points labeled T are from the triangle, so they are not analyzed. The depths from points of Triangle A (labeled $T_A$) and Triangle B (labeled $T_B$) are analyzed. In other words, for comparing the depth of the point T in the middle of the grid, the depth of point T is compared with (e.g., calculate the difference between) the depth of $T_A$ in the lower left square of the grid, the depth of $T_A$ in the middle left square of the grid, the depth of $T_A$ in the upper left square of the grid, the depth of $T_B$ in the middle upper square of the grid, and the depth of $T_B$ in the upper right square of the grid. If the difference between the depth of the point and any of the other points compared is greater than a threshold, then Triangle 700 is not projected. By performing depth filtering, large gradients are avoided. Although a 3×3 filter is shown, a larger filter is able to be implemented. In some embodiments, the threshold is adaptive, meaning the threshold is able to be changed depending on circumstances such as received information or the specific implementation.

Figure 8:
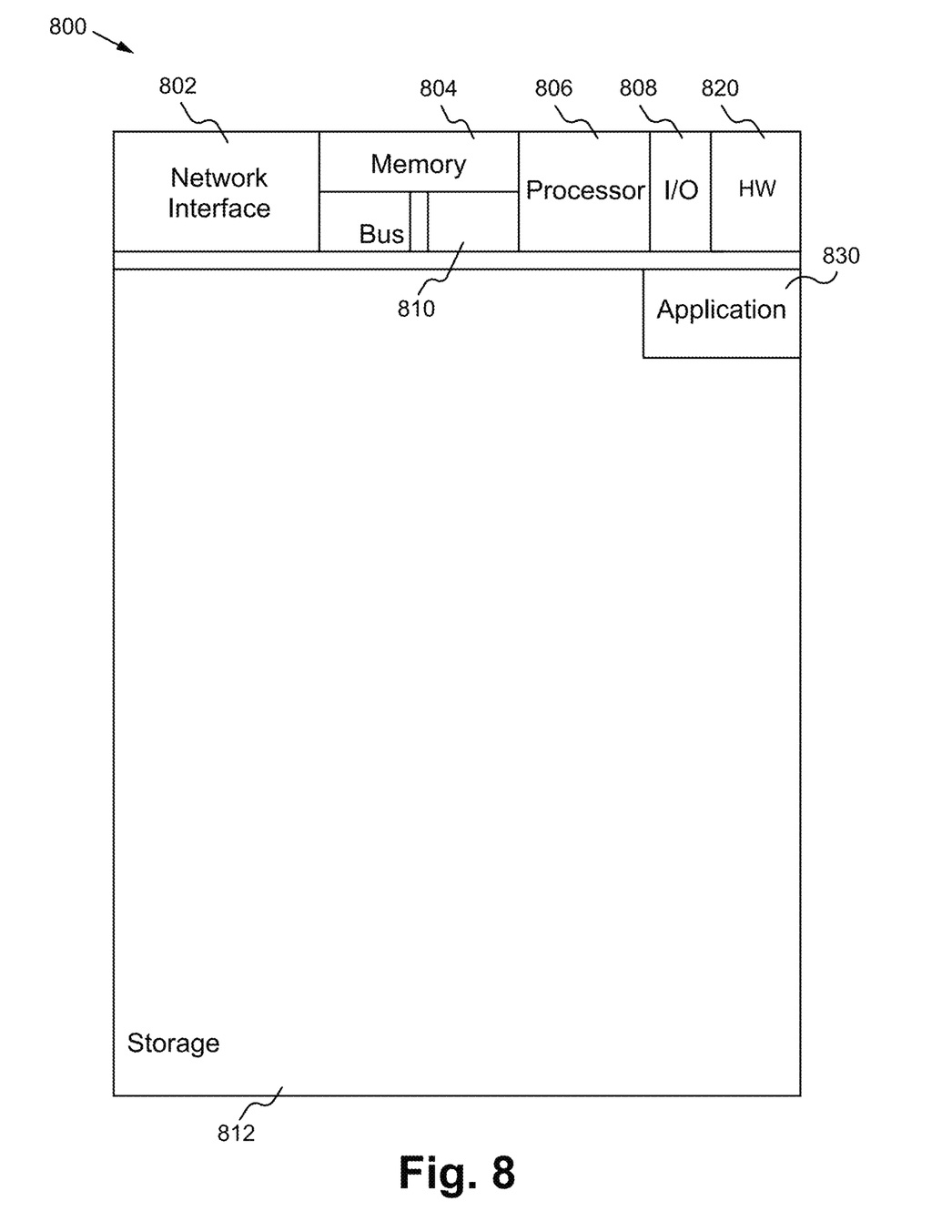
FIG. 8 illustrates a block diagram of an exemplary computing device configured to implement the patch generation for dynamic mesh coding method according to some embodiments.

FIG. 8 illustrates a block diagram of an exemplary computing device configured to implement the patch generation for dynamic mesh coding method according to some embodiments. The computing device 800 is able to be used to acquire, store, compute, process, communicate and/or display information such as images and videos including 3D content. The computing device 800 is able to implement any of the encoding/decoding aspects. In general, a hardware structure suitable for implementing the computing device 800 includes a network interface 802, a memory 804, a processor 806, I/O device(s) 808, a bus 810 and a storage device 812. The choice of processor is not critical as long as a suitable processor with sufficient speed is chosen. The memory 804 is able to be any conventional computer memory known in the art. The storage device 812 is able to include a hard drive, CDROM, CDRW, DVD, DVDRW, High Definition disc/drive, ultra-HD drive, flash memory card or any other storage device. The computing device 800 is able to include one or more network interfaces 802. An example of a network interface includes a network card connected to an Ethernet or other type of LAN. The I/O device(s) 808 are able to include one or more of the following: keyboard, mouse, monitor, screen, printer, modem, touchscreen, button interface and other devices. Patch generation for dynamic mesh coding application(s) 830 used to implement the patch generation for dynamic mesh coding implementation are likely to be stored in the storage device 812 and memory 804 and processed as applications are typically processed. More or fewer components shown in FIG. 8 are able to be included in the computing device 800. In some embodiments, patch generation for dynamic mesh coding hardware 820 is included. Although the computing device 800 in FIG. 8 includes applications 830 and hardware 820 for the patch generation for dynamic mesh coding implementation, the patch generation for dynamic mesh coding method is able to be implemented on a computing device in hardware, firmware, software or any combination thereof. For example, in some embodiments, the patch generation for dynamic mesh coding applications 830 are programmed in a memory and executed using a processor. In another example, in some embodiments, the patch generation for dynamic mesh coding hardware 820 is programmed hardware logic including gates specifically designed to implement the patch generation for dynamic mesh coding method.

In some embodiments, the patch generation for dynamic mesh coding application(s) 830 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the patch generation for dynamic mesh coding method, a device acquires or receives 3D content (e.g., point cloud content). The patch generation for dynamic mesh coding method is able to be implemented with user assistance or automatically without user involvement.

In operation, the patch generation for dynamic mesh coding method enables more efficient and more accurate 3D content encoding compared to previous implementations.

Some Embodiments of Patch Generation for Dynamic Mesh Coding

1. A method of patch generation comprising:
   computing face normals of triangles;
   computing face adjacency of the triangles;
   computing face neighbors of the triangles;
   implementing initial segmentation including classifying the normals of the triangles;
   performing refinement including locating and smoothing outliers in the classified normals; and
   performing patch segmentation of the triangles.
2. The method of clause 1 wherein computing face adjacency of the triangles and computing face neighbors of the triangles includes generating lists of adjacent triangles and neighboring triangles.

3. The method of clause 2 wherein generating lists of the adjacent triangles and the neighboring triangles includes factoring in a texture map boundary.
4. The method of clause 3 wherein factoring in the texture map boundary involves excluding a triangle that is on an opposite side of the boundary of a current triangle.
5. The method of clause 1 wherein performing patch segmentation comprises: removing degenerates, checking for vertex occlusion, checking for half-edges, checking for surface occlusion, depth filtering, depth range and connectivity analysis, and rasterizing a triangle.
6. The method of clause 5 wherein:
   removing degenerate triangles includes removing triangles that are lines or points by determining an area between the points is smaller than a threshold;
   checking for vertex occlusion includes determining whether a vertex of the triangle is occluded by an already projected triangle;
   checking for half-edges includes determining if the triangle shares an edge that is already shared by two projected triangles;
   checking for surface occlusion includes determining if an area between points of the triangle are occluded or would occlude the already projected triangle;
   depth filtering determines depth differentials of neighboring points and points of the triangle are smaller than a depth threshold;
   depth range and connectivity analysis includes determining whether the triangle touches at least one edge or vertex of the already projected triangles; and
   projecting and rasterizing the triangle.
7. The method of clause 5 wherein the triangle is added to a missing triangles list when a criterion is not met.
8. An apparatus comprising:
   a non-transitory memory for storing an application, the application for:
      computing face normals of triangles;
      computing face adjacency of the triangles;
      computing face neighbors of the triangles;
      implementing initial segmentation including classifying the normals of the triangles;
      performing refinement including locating and smoothing outliers in the classified normals; and
      performing patch segmentation of the triangles; and
   a processor coupled to the memory, the processor configured for processing the application.
9. The apparatus of clause 8 wherein computing face adjacency of the triangles and computing face neighbors of the triangles includes generating lists of adjacent triangles and neighboring triangles.
10. The apparatus of clause 9 wherein generating lists of the adjacent triangles and the neighboring triangles includes factoring in a texture map boundary.
11. The apparatus of clause 10 wherein factoring in the texture map boundary involves excluding a triangle that is on an opposite side of the boundary of a current triangle.
12. The apparatus of clause 8 wherein performing patch segmentation comprises: removing degenerates, checking for vertex occlusion, checking for half-edges, checking for surface occlusion, depth filtering, depth range and connectivity analysis, and rasterizing a triangle.
13. The apparatus of clause 12 wherein:
   removing degenerate triangles includes removing triangles that are lines or points by determining an area between the points is smaller than a threshold;
   checking for vertex occlusion includes determining whether a vertex of the triangle is occluded by an already projected triangle;
   checking for half-edges includes determining if the triangle shares an edge that is already shared by two projected triangles;
   checking for surface occlusion includes determining if an area between points of the triangle are occluded or would occlude the already projected triangle;
   depth filtering determines depth differentials of neighboring points and points of the triangle are smaller than a depth threshold;
   depth range and connectivity analysis includes determining whether the triangle touches at least one edge or vertex of the already projected triangles; and
   projecting and rasterizing the triangle.
14. The apparatus of clause 12 wherein the triangle is added to a missing triangles list when a criterion is not met.
15. A method of patch segmentation comprising:
   removing degenerate information;
   checking for vertex occlusion of a triangle;
   checking for half-edges of the triangle;
   checking for surface occlusion of the triangle;
   depth filtering of the triangle;
   performing depth range and connectivity analysis of the triangle; and
   projecting and rasterizing the triangle onto a canvas.
16. The method of clause 15 wherein removing degenerate triangles includes removing triangles that are lines or points by determining an area between the points is smaller than a threshold.
17. The method of clause 15 wherein checking for vertex occlusion includes determining whether a vertex of the triangle is occluded by an already projected triangle.
18. The method of clause 15 wherein checking for half-edges includes determining if the triangle shares an edge that is already shared by two projected triangles.
19. The method of clause 15 wherein checking for surface occlusion includes determining if an area between points of the triangle are occluded or would occlude the already projected triangle.
20. The method of clause 15 wherein depth filtering determines depth differentials of neighboring points and points of the triangle are smaller than a depth threshold.
21. The method of clause 15 wherein depth range and connectivity analysis includes determining whether the triangle touches at least one edge or vertex of the already projected triangles.
22. The method of clause 15 wherein the triangle is added to a missing triangles list when a criterion is not met.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of patch generation comprising:
computing face normals of triangles;
computing face adjacency of the triangles;
computing face neighbors of the triangles, wherein computing face adjacency of the triangles and computing face neighbors of the triangles includes generating lists of adjacent triangles and neighboring triangles, wherein generating lists of the adjacent triangles and the neighboring triangles includes factoring in a texture map boundary;
implementing initial segmentation including classifying the face normals of the triangles;
performing refinement including locating and smoothing outliers in the classified normals;
performing patch segmentation of the triangles; and
generating a mesh based on the patch segmentation of the triangles.

2. The method of claim 1 wherein factoring in the texture map boundary involves excluding a triangle that is on an opposite side of the boundary of a current triangle.

3. The method of claim 1 wherein performing patch segmentation comprises: removing degenerates, checking for vertex occlusion, checking for half-edges, checking for surface occlusion, depth filtering, depth range and connectivity analysis, rasterizing a triangle; wherein triangle removal is based on checking the vertex occlusion of the triangle, half-edges of the triangle, surface occlusion of the triangle, filtering of the triangle, and depth range and connectivity analysis.

4. The method of claim 3 wherein:
removing degenerate triangles includes removing triangles that are lines or points by determining an area between the points is smaller than a threshold;
checking for vertex occlusion includes determining whether a vertex of the triangle is occluded by an already projected triangle;
checking for half-edges includes determining if the triangle shares an edge that is already shared by two projected triangles;
checking for surface occlusion includes determining if an area between points of the triangle are occluded or would occlude the already projected triangle;
depth filtering determines depth differentials of neighboring points and points of the triangle are smaller than a depth threshold;
depth range and connectivity analysis includes determining whether the triangle touches at least one edge or vertex of the already projected triangles; and
projecting and rasterizing the triangle.

5. The method of claim 3 wherein the triangle is added to a missing triangles list when a criterion is not met.

6. An apparatus comprising:
a non-transitory memory for storing an application, the application for:
computing face normals of triangles;
computing face adjacency of the triangles;
computing face neighbors of the triangles, wherein computing face adjacency of the triangles and computing face neighbors of the triangles includes generating lists of adjacent triangles and neighboring triangles, wherein generating lists of the adjacent triangles and the neighboring triangles includes factoring in a texture map boundary;
implementing initial segmentation including classifying the face normals of the triangles;
performing refinement including locating and smoothing outliers in the classified normals;
performing patch segmentation of the triangles; and
generating a mesh based on the patch segmentation of the triangles; and
a processor coupled to the memory, the processor configured for processing the application.

7. The apparatus of claim 6 wherein factoring in the texture map boundary involves excluding a triangle that is on an opposite side of the boundary of a current triangle.

8. The apparatus of claim 6 wherein performing patch segmentation comprises: removing degenerates, checking for vertex occlusion, checking for half-edges, checking for surface occlusion, depth filtering, depth range and connectivity analysis, and rasterizing a triangle; wherein triangle removal is based on checking the vertex occlusion of the triangle, half-edges of the triangle, surface occlusion of the triangle, filtering of the triangle, and depth range and connectivity analysis.

9. The apparatus of claim 8 wherein:
removing degenerate triangles includes removing triangles that are lines or points by determining an area between the points is smaller than a threshold;
checking for vertex occlusion includes determining whether a vertex of the triangle is occluded by an already projected triangle;
checking for half-edges includes determining if the triangle shares an edge that is already shared by two projected triangles;
checking for surface occlusion includes determining if an area between points of the triangle are occluded or would occlude the already projected triangle;
depth filtering determines depth differentials of neighboring points and points of the triangle are smaller than a depth threshold;
depth range and connectivity analysis includes determining whether the triangle touches at least one edge or vertex of the already projected triangles; and
projecting and rasterizing the triangle.

10. The apparatus of claim 8 wherein the triangle is added to a missing triangles list when a criterion is not met.

11. A method of patch segmentation comprising:
computing face normals of triangles;
computing face adjacency of the triangles;
computing face neighbors of the triangles, wherein computing face adjacency of the triangles and computing face neighbors of the triangles includes generating lists of adjacent triangles and neighboring triangles, wherein generating lists of the adjacent triangles and the neighboring triangles includes factoring in a texture map boundary;
implementing initial segmentation including classifying the face normals of the triangles;
performing refinement including locating and smoothing outliers in the classified normals; and
performing patch segmentation of the triangles;
removing degenerate information;
checking for vertex occlusion of a triangle;
checking for half-edges of the triangle;
checking for surface occlusion of the triangle;
depth filtering of the triangle;
performing depth range and connectivity analysis of the triangle;
projecting and rasterizing the triangle onto a canvas;
removing triangles based on checking the vertex occlusion of the triangle, half-edges of the triangle, surface occlusion of the triangle, filtering of the triangle, and depth range and connectivity analysis; and generating a mesh based on the patch segmentation of the triangles.

12. The method of claim 11 wherein removing degenerate triangles includes removing triangles that are lines or points by determining an area between the points is smaller than a threshold.

13. The method of claim 11 wherein checking for vertex occlusion includes determining whether a vertex of the triangle is occluded by an already projected triangle.

14. The method of claim 11 wherein checking for half-edges includes determining if the triangle shares an edge that is already shared by two projected triangles.

15. The method of claim 11 wherein checking for surface occlusion includes determining if an area between points of the triangle are occluded or would occlude the already projected triangle.

16. The method of claim 11 wherein depth filtering determines depth differentials of neighboring points and points of the triangle are smaller than a depth threshold.

17. The method of claim 11 wherein depth range and connectivity analysis includes determining whether the triangle touches at least one edge or vertex of the already projected triangles.

18. The method of claim 11 wherein the triangle is added to a missing triangles list when a criterion is not met.

* * * * *